(12) United States Patent
Glasheen et al.

(10) Patent No.: US 10,408,683 B2
(45) Date of Patent: Sep. 10, 2019

(54) HIGH TEMPERATURE PROBE

(71) Applicant: AMETEK, INC., Berwyn, PA (US)

(72) Inventors: William M. Glasheen, Derry, NH (US); Mark Agami, Reading, MA (US)

(73) Assignee: AMETEK, Inc., Berwyn, PA (US)

( * ) Notice: Subject to any disclaimer, the term of this patent is extended or adjusted under 35 U.S.C. 154(b) by 472 days.

(21) Appl. No.: 14/909,528

(22) PCT Filed: Aug. 6, 2014

(86) PCT No.: PCT/US2014/049857
§ 371 (c)(1),
(2) Date: Feb. 2, 2016

(87) PCT Pub. No.: WO2015/021096
PCT Pub. Date: Feb. 12, 2015

(65) Prior Publication Data
US 2016/0169749 A1    Jun. 16, 2016

Related U.S. Application Data

(60) Provisional application No. 61/951,068, filed on Mar. 11, 2014, provisional application No. 61/907,555, (Continued)

(51) Int. Cl.
*G01K 1/00* (2006.01)
*G01K 13/00* (2006.01)
(Continued)

(52) U.S. Cl.
CPC ............. *G01K 1/08* (2013.01); *B23K 1/0008* (2013.01); *B23K 1/19* (2013.01); *G01K 7/02* (2013.01)

(58) Field of Classification Search
USPC .................. 374/148, 179, 208, 100
See application file for complete search history.

(56) References Cited

U.S. PATENT DOCUMENTS 3,151,484 A * 10/1964 Mohn ............... G01K 1/14
  136/221
3,281,518 A * 10/1966 Stroud ............... G01K 1/18
  136/230
(Continued)

FOREIGN PATENT DOCUMENTS

CN    2096749 U    2/1992
CN    1229189 A    9/1999
(Continued)

OTHER PUBLICATIONS

European Communication for European Application No. 14 755 742.5, dated Jul. 12, 2017, 5 pages.
(Continued)

*Primary Examiner* — Mirellys Jagan
(74) *Attorney, Agent, or Firm* — RatnerPrestia

(57) ABSTRACT

High temperature probes and methods for assembling high temperature probes are disclosed. The high temperature probes may include a rod with a thermocouple embedded within the rod, and a ceramic matrix composite sheath substantially surrounding the rod. The high temperature probes may also include an outer metal tube surrounding a portion of the rod, and an inner metal tube positioned between the alumina rod and the outer metal tube, the inner metal tube being configured to prevent the rod from spatial displacement with respect to the outer metal tube.

28 Claims, 11 Drawing Sheets

Related U.S. Application Data filed on Nov. 22, 2013, provisional application No. 61/863,119, filed on Aug. 7, 2013.

(51) Int. Cl.
| | | |
|---|---|---|
| *G01K 7/00* | (2006.01) | |
| *G01K 1/08* | (2006.01) | |
| *G01K 7/02* | (2006.01) | |
| *B23K 1/00* | (2006.01) | |
| *B23K 1/19* | (2006.01) | |

(56) References Cited

U.S. PATENT DOCUMENTS

| | | | | |
|---|---|---|---|---|
| 3,606,792 | A * | 9/1971 | Yoshimoto | G01K 1/08 |
| | | | | 374/155 |
| 3,954,508 | A | 5/1976 | Derby | |
| 4,243,402 | A | 1/1981 | Sensi | |
| 4,538,927 | A * | 9/1985 | Jochemczyk | G01K 13/002 |
| | | | | 374/163 |
| 4,808,241 | A * | 2/1989 | Hollander | G01K 7/023 |
| | | | | 136/225 |
| 4,830,515 | A * | 5/1989 | Cortes | G01K 1/14 |
| | | | | 136/221 |
| 5,917,145 | A | 6/1999 | Parent et al. | |
| 6,280,083 | B2 | 8/2001 | Kita et al. | |
| 6,536,950 | B1 | 3/2003 | Green et al. | |
| 7,611,280 | B2 * | 11/2009 | Habboosh | C22C 5/04 |
| | | | | 136/200 |
| 7,712,957 | B2 * | 5/2010 | Kendall | G01K 1/105 |
| | | | | 374/139 |
| 2002/0001334 | A1 * | 1/2002 | Kita | G01K 1/12 |
| | | | | 374/140 |
| 2002/0136263 | A1 * | 9/2002 | Wilkins | G01K 1/14 |
| | | | | 374/141 |
| 2008/0205483 | A1 * | 8/2008 | Rempe | G01K 7/02 |
| | | | | 374/179 |
| 2009/0268779 | A1 * | 10/2009 | Hotta | G01K 1/10 |
| | | | | 374/179 |

FOREIGN PATENT DOCUMENTS

| | | |
|---|---|---|
| CN | 1390298 A | 1/2003 |
| EP | 0 928 958 | 7/1999 |
| JP | 59136630 A | 8/1984 |
| JP | 2000 088667 | 3/2000 |
| JP | 2003511689 A | 3/2003 |
| WO | WO 01/27579 | 4/2001 |

OTHER PUBLICATIONS

International Search Report and Written Opinion for PCT/US2014/049857 dated Oct. 27, 2014.
International Preliminary Report on Patentability and Written Opinion for International Application No. PCT/US2014/049857 dated Oct. 27, 2014.
Eurasian Office Action for Eurasian Application No. 201690358/31, dated Oct. 25, 2017 with translation, 6 pages.
Chinese Office Action for Chinese Application No. 201480044299.9, dated Jan. 29, 2018, including English translation, 27 pages.
Eurasian Office Action for Eurasian Application No. 201690358/31, dated Mar. 28, 2018, including English translation, 6 pages.
Notice of Reasons for Rejection for Japanese Application No. 2016-533389, dated Jul. 10, 2018 with translation, 9 pages.
Eurasian Office Action for Eurasian Application No. 201690358/31, dated Mar. 4, 2019, including English translation, 7 pages.
Second Chinese Office Action for Chinese Application No. 201480044299.9, with English Translation, dated Oct. 19, 2018—18 pages.
Zheng Chunlu, et al., "Sensor Application Project-based Tutorial," Central Radio & TV University Press, May 30, 2012, pp. 42-43, with partial English translation.

\* cited by examiner

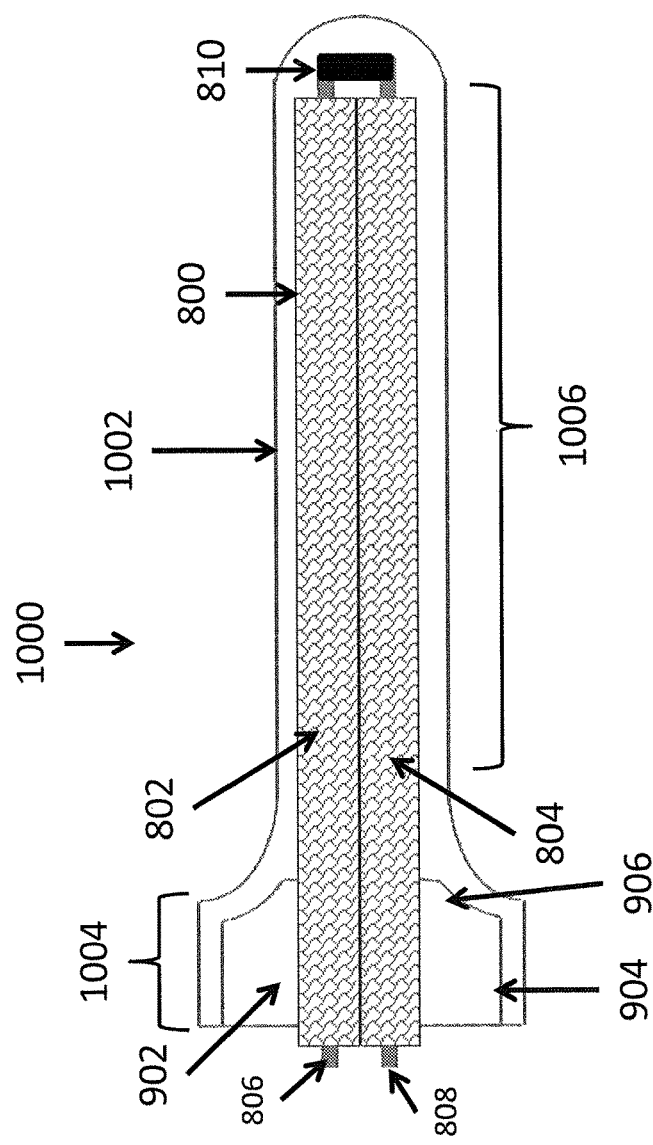
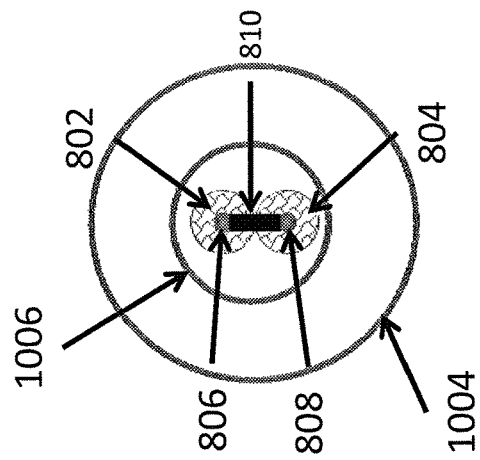
FIG. 10A
FIG. 10B

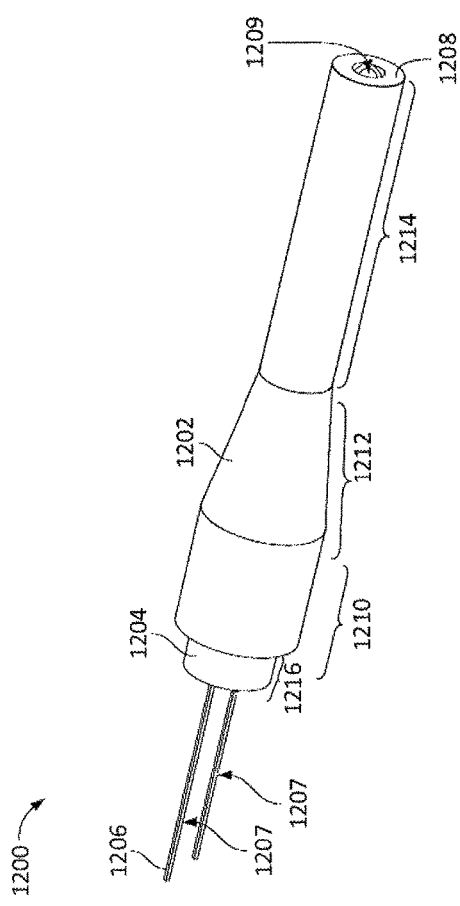
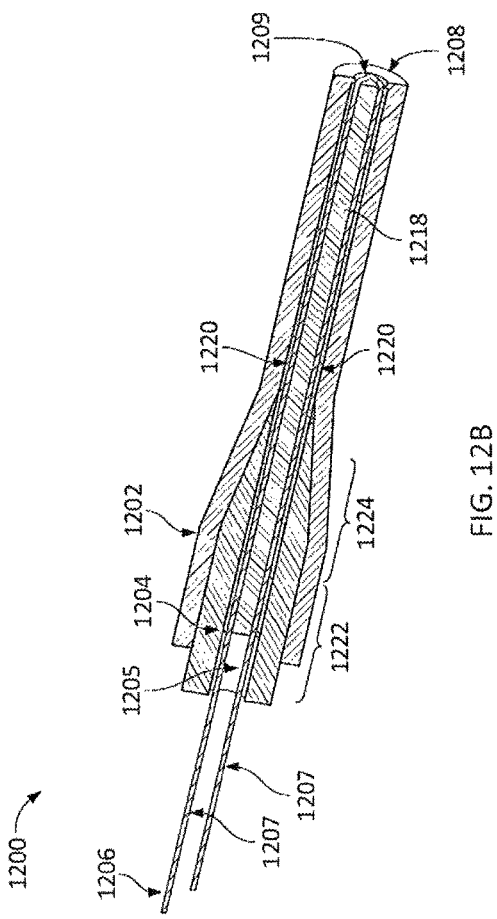
FIG. 12A
FIG. 12B

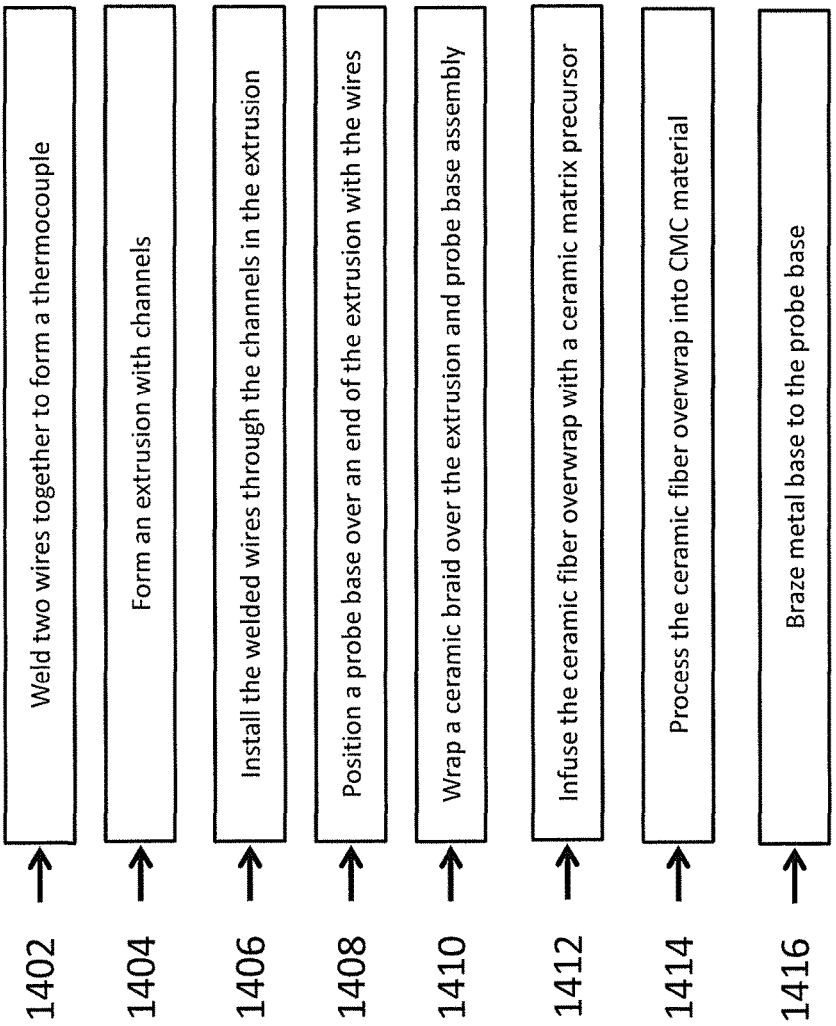

HIGH TEMPERATURE PROBE

CROSS REFERENCE TO RELATED APPLICATIONS

This application is the U.S. national phase application of PCT International Application No. PCT/US2014/059867 filed Aug. 6, 2014, which claims priority to U.S. Provisional Application No. 61/951,068 entitled "HIGH TEMPERATURE PROBE" filed Mar. 11, 2014, U.S. Provisional Application No. 61/907,555 entitled "HIGH TEMPERATURE PROBE" filed Nov. 22, 2013, and U.S. Provisional Application No. 61/863,119 entitled "HIGH TEMPERATURE PROBE" filed Aug. 7, 2013, the contents of these applications incorporated herein by reference.

FIELD OF THE INVENTION

The invention relates to the field of temperature measurement and, more particularly, to temperature probes for use in harsh environments such as airplane turbines.

BACKGROUND OF THE INVENTION

Temperature probes are needed to measure temperature in harsh environments such as airplane turbines. The exhaust present in airplane turbines is strong, hot, and chemically active. Furthermore, exhaust temperature is expected to increase in future airplane turbines. Currently, metals such as nickel alloys are used to protect probes used in the harsh environment of an airplane turbine. Such probes, however, will have a relatively short life span in future, hotter exhaust applications.

SUMMARY OF THE INVENTION

Aspects of the invention include temperature probes and methods of forming temperature probes. A temperature probe may include a rod, a thermocouple, an outer tube, an inner tube, and a sheath. The thermocouple is embedded within the rod. The outer tube surrounds at least a portion of the rod. The inner tube is positioned between the rod and the tube to prevent displacement of the rod. A ceramic matrix composite sheath substantially surrounds the rod and outer metal tube.

Further aspects of the invention includes processes for assembling temperature probes. Processes for assembling a temperature probe may include positioning a thermocouple between a first member and a second member, mating the first member and the second member to form a rod, placing an outer tube over a portion of the rod to engage the first member and the second member, placing an inner tube between at least a portion of the rod and at least a portion of the outer tube to secure the rod with respect to the outer tube, and applying a ceramic matrix composite sheath to substantially cover the rod and the outer metal tube.

Additional aspects of the invention include temperature probes that include a rod, a thermocouple embedded in the rod, and a probe base extending over the end of the rod. The temperature probes may also include a sheath covering at least a portion of the rod and a portion of the probe base. At least one of the rod, the probe base, or the sheath include a ceramic matrix composite material.

Further aspects of the invention are directed to methods for assembling temperature probes that include forming a rod with at least one channel, installing wires of a thermocouple through the at least one channel, positioning a probe base over an end of the rod, wrapping a ceramic braid over the probe base and the rod, and processing the ceramic braid into a ceramic matrix composite material, thereby forming a sheath around the probe base and rod.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures:

FIGS. 10A and 10B are views of a probe according to aspects of the invention;

FIGS. 12A and 12B are views of a probe in accordance with aspects of the invention;

FIG. 14 is a flow chart illustrating steps for assembling a probe according to aspects of the invention.

DETAILED DESCRIPTION OF THE INVENTION

Figure 1:
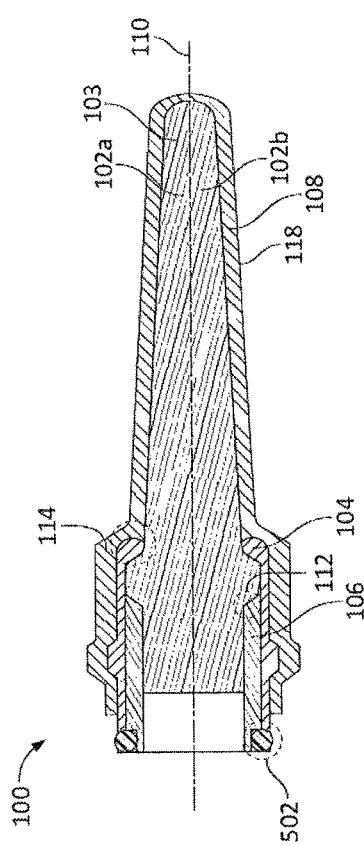
FIG. 1 is a cross sectional view of a probe in accordance with aspects of the invention.

Higher performance temperature sensors are needed. Temperatures of recent or newest turbines are going into about 1100 C to about 1200 C range for the temperature sensing requirements. Future turbines, for the necessary sensor accuracy and monitoring benefits will need to be greater than 1300 C. The previous standard materials for such sensors, nickel based superalloys, will not survive at temperatures greater than 1200 C.

Keeping the measurement closer to the combustor means more accurate hot-section monitoring. This benefits maintenance interval planning and turbine efficiency.

The sensor will survive in the turbine flow at up to 1350 C for short periods and continuously above 1200 C. In one embodiment, a ceramic matrix composite probe carries the ceramic insulated Platinel® thermocouple which has an EMF output very similar to Type K standard output.

Without the greater than 1300 C temperature capability, the temperature sensor has to be further from the turbine hotter sections. With 1300 C sensor temperature capability, the sensor is closer and data is better for turbine monitoring.

A ceramic matrix composite based temperature sensor for turbine applications to 1350 C is designed. The previous highest temperature performance turbine sensors have used nickel based superalloys to achieve nearly 1200 C performance. Life at much higher than 1200 C with any nickel alloys is severely limited. Suitable materials for new hot section parts by turbine OEMs include ceramic matrix composites. Ceramic matrix composites have the benefit compared to bare ceramics alone of creep resistance. Ceramics are already used inside high performance temperature sensors in the form usually of magnesium oxide; aluminum oxide is also used. In one embodiment, aluminum oxide ceramic matrix composite is applied to the exterior of a high performance temperature probe with both alumina fibers and matrix. The oxide family of ceramics have a better resistance to the very challenging chemical environment of a turbine combustor compared to carbon composites that require an environmental barrier coating, making them susceptible to erosion and subsequent failure. However, some carbon of silicon carbide based composites have higher temperature ratings than oxide ceramics.

Aluminum oxide ceramic matrix composites operate to greater than 1200 C and do not require an environmental barrier coating as they are resistant to the environment inside a turbine.

Without the greater than 1300 C temperature capability the temperature sensor has to be further from the turbine hotter sections. A sensor location further from the turbine to enable nickel alloys means it will measure a mix of the hot combustion gas and the cooling compressor air and the uncertainty to know the turbine temperature is increased and the ability to monitor the turbine for temperature degradation is worse, which impacts maintenance planning negatively.

A benefit of the invention is that there is no compromise with a temperature sensor performance equal to new turbines' requirements. The ceramic matrix composite probe can be closer to the combustor in the normal sensor turbine location and enable no loss of performance knowledge. New and future turbines plan to operate at higher temperatures. The components in the hot section of the turbines need to meet new higher performance levels, specifically temperature as temperature increases.

Ceramic matrix composites have not been used in turbine temperature sensors before this. Higher temperature capability adds value to the turbine and adds value for the turbine operator, differentiating that turbine compared to its competitors. The density of ceramic matrix composites is also less than metals for a small weight benefit, which is always welcome.

Alternative rods made of less rigid materials may be used in accordance with embodiments of the invention. Rigid rods have little ductility compared to rods made of ceramic matrix composite (CMC) materials. CMC materials fail more gracefully than rigid ceramics like alumina. Embodiments of rods that are less brittle than ceramic rods are described below.

FIG. 1 depicts a cross-sectional view of one embodiment of a probe 100 in accordance with aspects of the invention. The illustrated probe 100 contains a sheath 108, a rod 103, an inner tube 106, and an outer tube 104. The probe 100 also contains a thermocouple, described below with reference to FIG. 2, embedded within the rod 103. The probe 100 has an axis 110 extending lengthwise through the center of the probe 100.

The rod 103 may be alumina-based (e.g., aluminum oxide), silicon-based, silicon carbide-based (e.g., SiC fiber, SiC matrix, etc.), carbon based, and/or other materials/combination of materials suitable for use within temperature probes. The rod 103, sheath 108, tubes 106 and 104, and/or other components of the probe 100 may be constructed of fiber/matrix material to be formed into a CMC material. For example, fibers may include CH Nicalon™, Hi-Nicalon™, Sylramic™, Carbon, Nextel™ 312, Nextel™ 610, Nextel™ 720, nickel alloy metals, etc. The matrix may be silicon-based (e.g., SiNC, SiC+Si3N4, SiC, SiO2, etc.), alumina-based (e.g., Al2O3, etc.) and/or a combination of silica-based and alumina-based material (e.g., SiO2+Al2O3, etc.).

The illustrated rod 103 in FIG. 1 is formed from a first member 102a and a second member 102b. The members 102a and 102b may be mated along the axis 110 to form the rod 103. In an embodiment, the members 102a and 102b are substantially symmetrical to one another. Although a rod formed from two symmetrical members is illustrated and described herein, it is contemplated that the rod 103 may have a unibody construction, may be formed from more than two members, and the members need not be symmetrical.

Figure 2:
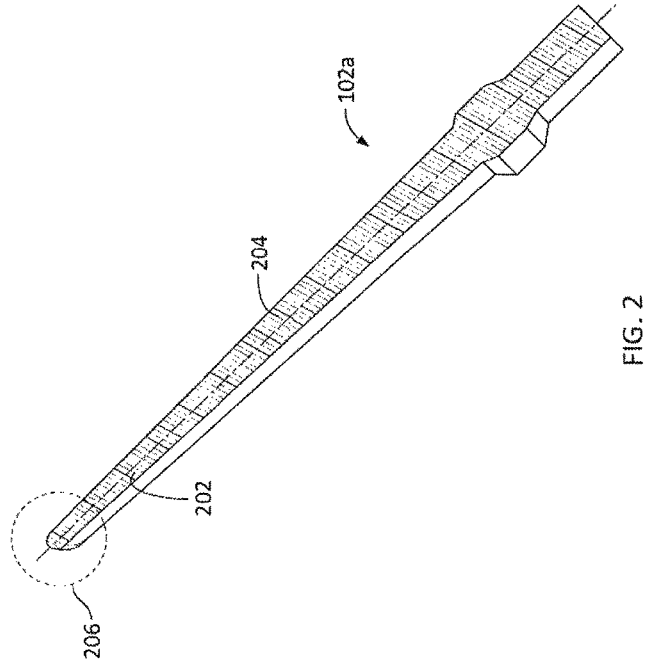
FIG. 2 is a perspective view of a member of a rod in accordance with aspects of the invention.

FIG. 2 depicts the first member 102a of the rod of FIG. 1. The member 102a has a groove (not shown) on a mating surface 204. The mating surface 204 may be mated with a corresponding mating surface (not shown) of member 102b. In an embodiment, the groove is present in only the first member to form the channel for the thermocouple 202. In other embodiments, at least one other member (e.g., member 102b) has a groove that when combined with the groove of the first member 102a forms the channel for the thermocouple 202. The thermocouple 202 is placed in the groove of one member 102a prior to mating. A temperature functional portion 206 of the thermocouple is located at an end of the probe 100, which may be exposed and/or extend outward of the sheath 108.

Figure 3:
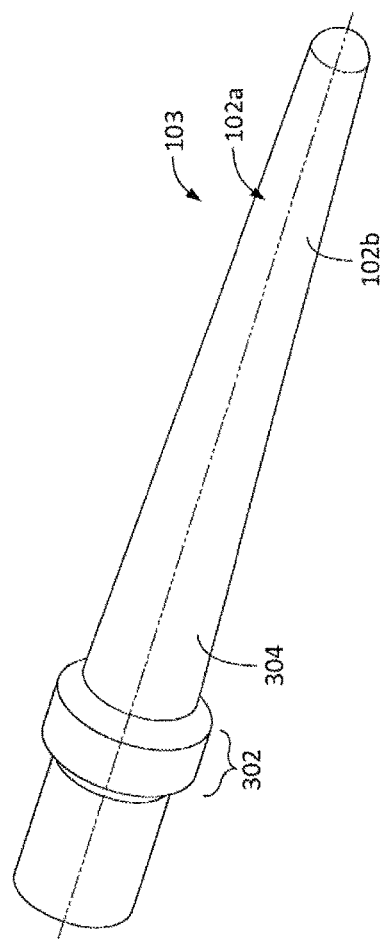
FIG. 3 is a perspective view of a rod in accordance with aspects of the invention.

FIG. 3 depicts the rod 103 formed from the mated first member 102a and second member 102b. Mating the first member 102a and the second member 102b embeds the thermocouple 202 in between. In some embodiments the rod 103 has a securing protrusion 302. The securing protrusion 302 is located in an area of the rod 103 having a cross section in a plane normal to the axis 110 that is larger in circumference than the cross section at other points. Although FIG. 3 illustrates the securing protrusion 302 as an uniform increase in the circumference of the outer surface 304 of the rod 103, it is contemplated that any structural variation in the outer surface 304 that would prevent the rod from sliding axially past a surrounding tube, such as tube 104, can be used as a securing protrusion.

Figure 4:
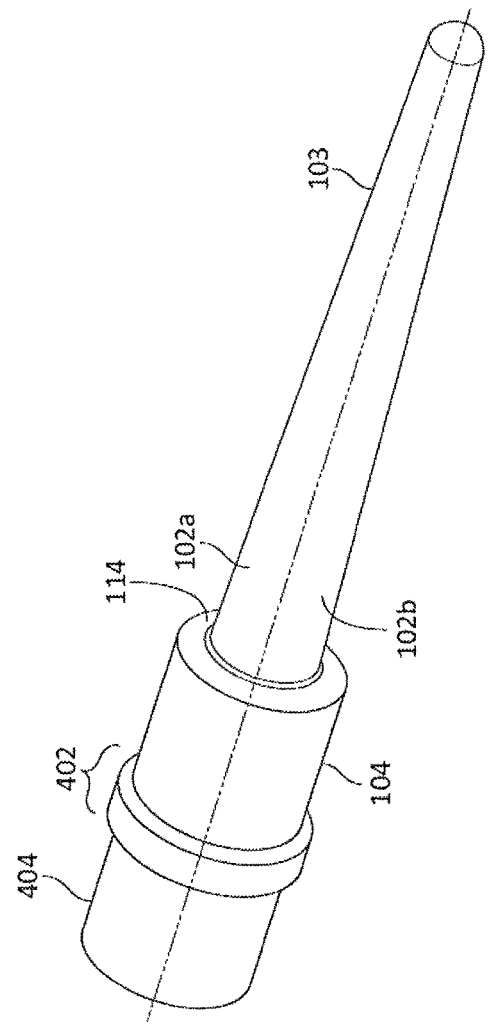
FIG. 4 is a perspective view of an outer tube surrounding a rod in accordance with aspects of the invention.

FIG. 4 depicts an outer tube 104 surrounding the rod 103. The placement of the outer tube 104 holds the first member 102a and the second member 102b in the mated position. The outer tube 104 may have a lip 114 that engages the securing protrusion 302 on the rod 103 to obstruct the rod 103 from fully passing through the outer tube 104. The outer tube 104 may be made out of chrome or nickel, alloys, alumina, CMC, or other material suitable for use in temperature probes.

The illustrated outer tube 104 also has a securing protrusion 402 on the outer surface 404 to prevent displacement of the sheath 108. Although FIG. 4 illustrates the securing protrusion 402 as an uniform increase in the circumference an outer surface 404 of the outer tube 104, it is contemplated that any structural variation in the outer surface 404 that prevents the sheath 108 from displacement along the axis 110 can be used.

Figure 5:
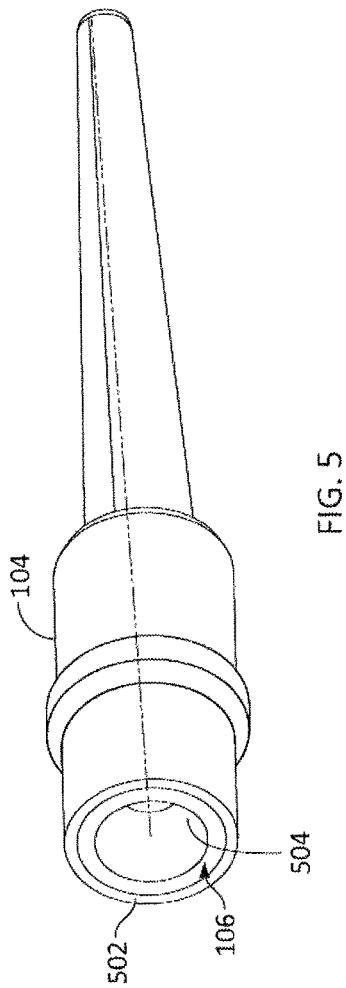
FIG. 5 is a perspective view of an inner tube placed within an outer tube that surrounds a rod in accordance with aspects of the invention.

FIG. 5 depicts the rod 103, the outer tube 104, and an inner tube 106. The inner tube 106 may contact the inner surface of the outer tube 104 and the outer surface 304 of the rod 103. A first end 112 of the inner tube 106 may contact the securing protrusion 302 on the rod 103. The inner tube 106 may be welded 502 to the outer tube 104. Known welding techniques may be used. It is contemplated that the inner tube 106 and the outer tube 104 may be affixed through methods other than welding that are suitable for using in high temperature environments (e.g., brazing, processing with CMC materials, etc.). Affixing the outer tube 104 to the inner tube 106 secures the rod 103 from displacement with respect to the outer tube 104. In an embodiment, the securing protrusion 302 on the rod is secured between the first end 112 of the inner tube 106 and the protrusion 404 on the inner surface of the outer tube 104.

In an embodiment, a portion of an inner surface 504 of the inner tube 106 is not in contact with the outer surface 304 of the rod 103. This portion of the inner surface 504 may be adapted for attachment with other devices or articles. The inner surface may be adapted for attachment using screw threads, notches, protrusion, or other suitable methods of attachment. The inner tube 106 may be made out of chrome or nickel, alloys, CMC, or any material suitable for use in temperature probes.

Referring back to FIG. 1, the sheath 108 is applied over the rod 103 and the outer tube 104. The sheath 108 may be formed from a variety of ceramic matrix composites. The ceramic matrix composite may be carbon fibers in carbon matrix, carbon fibers in a silicon carbide matrix, silicon carbide fibers in silicon carbide matrix, and alumina fibers in alumina matrix, for example. The sheath 108 may be applied to the rod 103 in a manner that will be understood by one of skill in the art from the description herein. The outer surface 118 of the sheath 108 may have a smoothness around 125 or less. In one embodiment, the smoothness of the outer surface 118 of the sheath 108 is less than 32. The sheath 108 may have a thickness of between about 0.03 inches and 0.06 inches.

The sheath 108 is affixed to the outer tube 104. In one embodiment the sheath 108 is formed to contact the securing protrusion 402 on the outer surface 404 of the outer tube 104, which impedes displacement of the sheath 108.

As depicted in FIGS. 1-5, the temperature probe has a frustoconical shape extending downward toward the temperature functional portion 206, with the end that includes the outer tube 104 having a larger diameter than the end toward the temperature functional portion 206. The larger diameter toward the end of the outer tube 104 provides the temperature probe with stress resistance against forces applied to the probe during operation.

Figure 6:
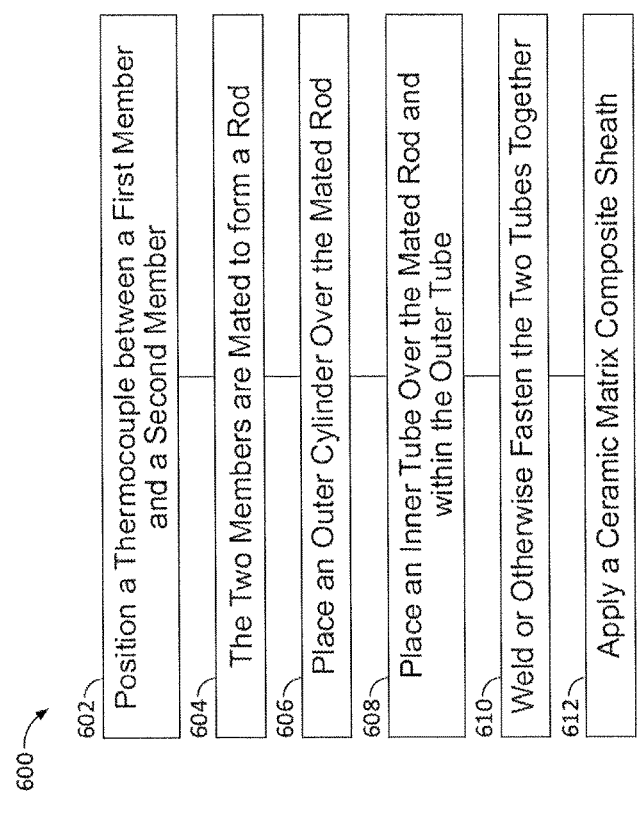
FIG. 6 is a flow chart illustrating steps for assembling a probe in accordance with aspects of the invention.

FIG. 6 depicts a flow chart 600 of steps for assembling an embodiment of a probe in accordance with aspects of the invention. Steps of the flow chart are described below with reference to the probe in FIGS. 1-5. It will be understood that the steps may be used to assemble probes other than those depicted in FIGS. 1-5 and that one or more of the steps 602-610 may be performed in a different order and/or may be omitted.

At block 602, a thermocouple is positioned between a first member and a second member. The thermocouple 202 may be positioned between the first member 102a and the second member 102b. In an embodiment, the thermocouple 202 is positioned in a channel that is formed by a groove in at least one member. The first member and the second member may be symmetrical.

At block 604, a rod is formed by mating a first member and a second member. The rod 103 may be formed by mating the first member 102a and the second member 102b. The first member 102a and the second member 102b may be mated along the first member's mating surface 204 and the second member's matting surface (not shown). In an embodiment, the rod 103 is formed from a material that is chemically compatible with the sheath 108 using a machine ground, cast, or a combination of both forming processes.

At block 606, an outer tube is placed over at least a portion of the rod. The outer tube 104 may be placed over at least a portion of the rod 103. The placement of the outer tube 104 engages the first member 102a and the second member 102b. The material forming the outer tube is metal or other material suitable for use in temperature probes.

At block 608, an inner tube is positioned between a portion of the outer tube and a portion of the rod. The inner tube 106 may be positioned between a portion of the outer tube 104 and a portion of the rod 103. The placement of the inner tube 106 obstructs the rod's 103 movement along the axis 110 with respect to the outer tube 104. The material forming the inner tube 106 may be metal or other material suitable for use in a temperature probe at or above about 2000 degrees Fahrenheit. In some embodiments the material forming the inner tube 106 is suited for temperatures around 2500 degrees Fahrenheit or hotter.

At block 610, an inner tube and an outer tube may be welded or otherwise affixed. The inner tube 106 and the outer tube 104 may be welded or otherwise affixed through known welding techniques, including but not limited to, tungsten inert gas welding or laser welding. It is also contemplated that the inner tube 106 and the outer tube 104 may be affixed through other methods suitable for affixing components of a probe (e.g., brazing, CMC processing, etc.).

At block 612, a ceramic matrix composite sheath is applied to substantially cover the rod. The ceramic matrix composite sheath 108 is applied to substantially cover the rod 103. The sheath 108 may be applied to the outer tube as well. Standard methods of applying ceramic matrix composite sheaths may be used. The sheath 108 may increase the ductility and extent of plastic deformation experienced by the probe 100 prior to breaking.

Figure 7:
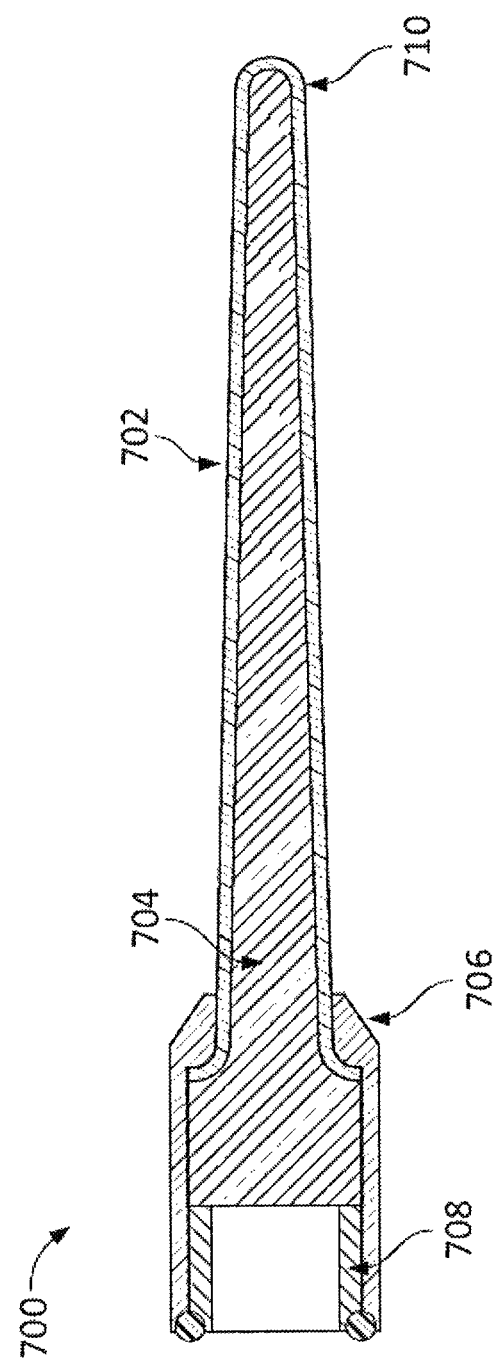
FIG. 7 is a cross sectional view of a probe in accordance with aspects of the invention.

Referring next to FIG. 7, an embodiment of a temperature probe is depicted in accordance with aspects of the invention. The probe 700 is rated for up to 1350 C. It has the ceramic matrix composite sheath 702, the ceramic interior 704 and the Platinel® wire (not shown) for thermocouple signal. The probe base 708 at the turbine wall is cooler than the tip 710 and a selection of satisfactory nickel superalloy can be made with planned capability of 1150 C. Materials other than a nickel superalloy may be selected, such as the materials described with respect to the probe 100. The dimensions may include approximately about 70 mm insertion depth with a diameter at the tip 710 of about 4 mm.

Figure 8B:
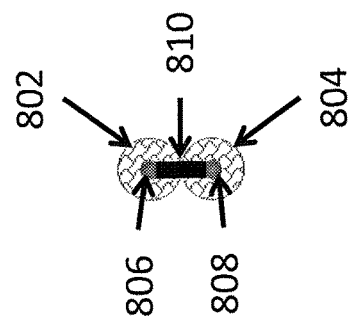
FIGS. 8A and 8B are views of a rod for a probe according to aspects of the invention.
Figure 8A:
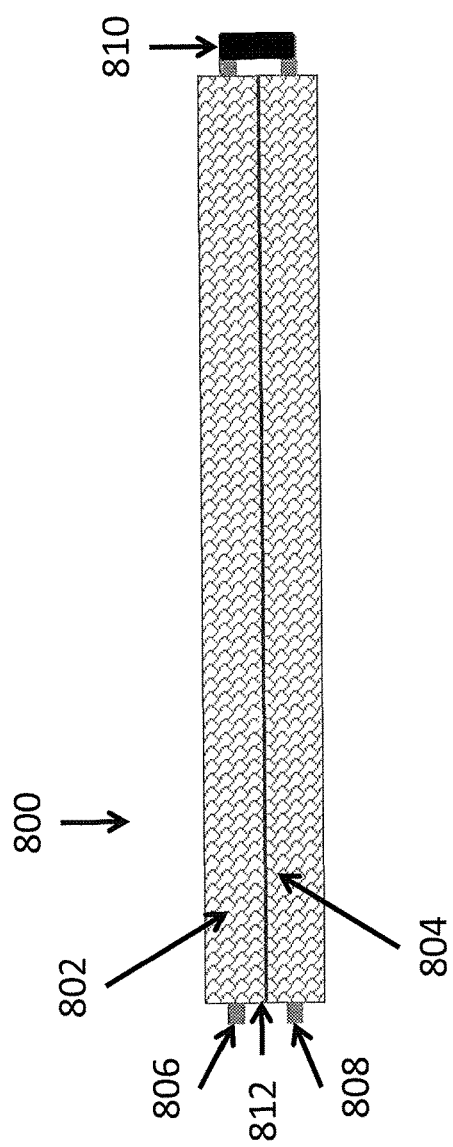

Referring to FIGS. 8A and 8B, a rod for use in a turbine temperature probe is shown. Two polarity thermocouple wires 806 and 808 (e.g., one wire is positive and one wire is negative) that are joined by a thermocouple junction 810 at one end of each of the wires are embedded within the rod 800. In one embodiment, the wires are made of a high temperature thermocouple system (e.g., platinum alloy, Platinel®, etc.). Other suitable CMC materials will be understood by one of skill in the art from the description herein. A ceramic fiber may be braided over each of the thermocouple wires 806 and 808 individually, such as ceramic braid 802 and ceramic braid 804. The illustrated rod 800 includes ceramic fiber is cylindrically braided over the wires. In an embodiment, a ceramic fiber is braided over both wires 806 and 808. As seen in FIG. 8A, the wires 806 and 808 are welded together at welding point 812, thereby forming a thermocouple. The ceramic fibers over the wires may then be processed at high temperatures to result in a matrix that exists through the ceramic fibers, thereby forming the rod 800.

Figure 9B:
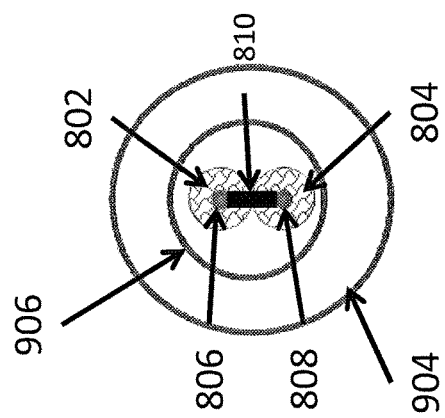
FIGS. 9A and 9B are views a rod with a base for a probe in accordance with aspects of the invention.
Figure 9A:
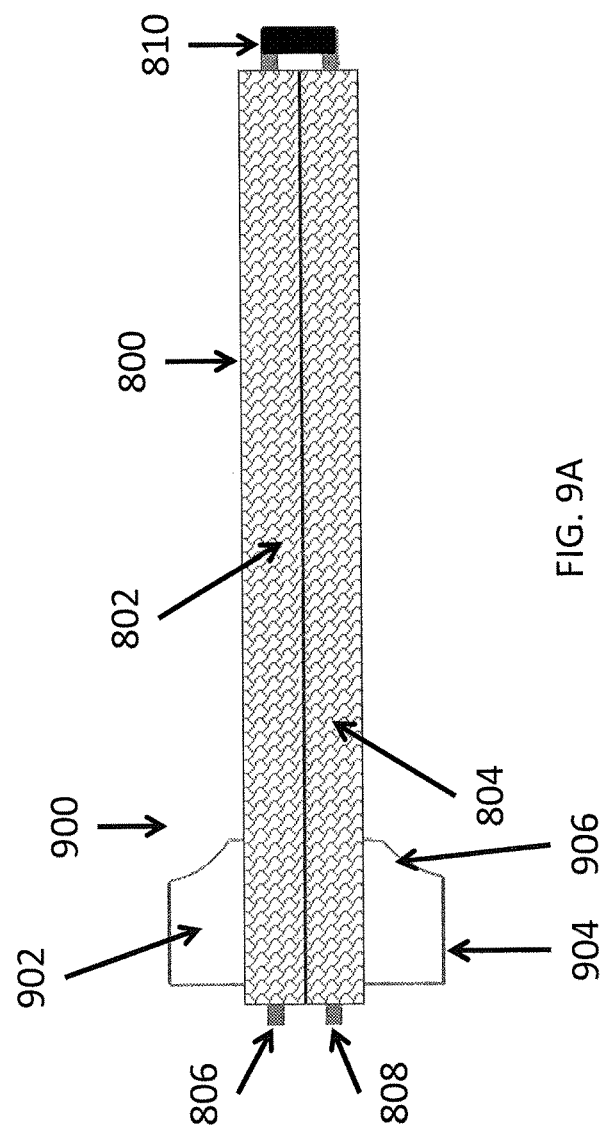

In FIGS. 9A and 9B, a rod with a base is shown according to embodiments of the invention. The base 902 may be made of a ceramic material. The base 902 has a first section 904 and a second section 906, with the first section 904 being of a diameter larger than the diameter of the second section 906. The base may function similarly to outer tube 104 described above with respect to FIGS. 1-6.

Referring to FIGS. 10A and 10B, a temperature probe is shown according to embodiments of the invention. The temperature probe includes the rod 800, the base 902, and a sheath 1002 covering rod 800 and base 902. The sheath 1002 may be made of a CMC material and function similarly to sheath 108. The wires 806 and 808 exit the probe at the base 902 and are available to weld to extension wires. In embodiments with sheath 1002, base 902, and rod 800, the entire temperature probe may be made of high temperature CMC materials with the thermocouple wires 806 and 808 inside, thereby rendering the sensor less brittle.

Figure 11:
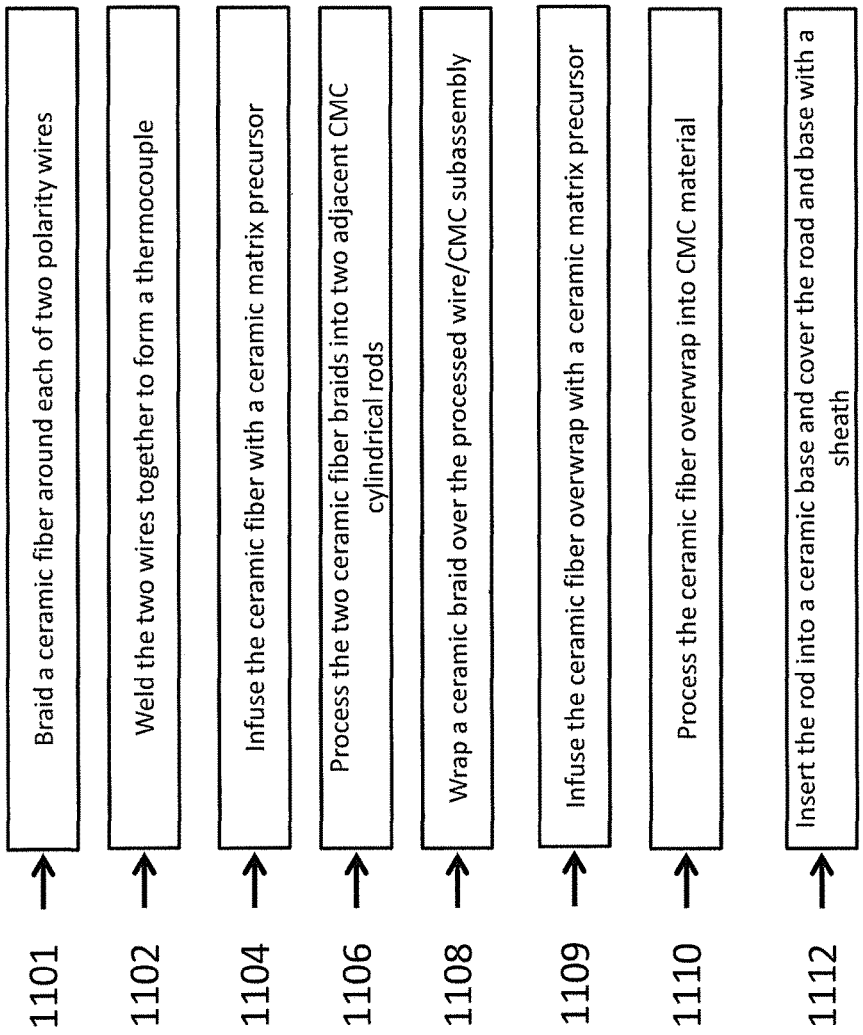
FIG. 11 is a flow chart illustrating steps for assembling a probe in accordance with aspects of the invention.

Referring next to FIG. 11, a flowchart 1100 of steps for assembling a temperature probe is shown. At block 1101, a ceramic fiber is braided over two polarity wires. The two polarity wires may be high temperature thermocouple metals (e.g., platinum alloy, Platinel®, etc.). The ceramic fiber may be an alumina fiber such as Nextel 720 and/or other materials such as those described with respect probe 100. In one embodiment, the ceramic fiber is cylindrically braided around each wire.

At block 1102, the two polarity wires are welded together to form a thermocouple for a temperature probe. The welding may be a simple fusion weld without filler wire. At this point in the assembly, the wires form a thermocouple.

At block 1104, the two cylindrical braids are infused with a ceramic matrix precursor. The braid may be infused by way of liquid or vapor. In one embodiment, a sol gel process is applied to infuse the wires. Once the braid is infused, the wires may be held in a fixture and exposed to an elevated temperature (e.g., about 400 F) until solid enough to stand without distortion.

At block 1106, the infused cylindrical braids are processed into two adjacent CMC cylindrical rods. In an embodiment, the braids are processed at a high temperature (e.g., about 1200 C) to result in a matrix that exists through the ceramic fibers that were braided over the wires at block 1101. This results in a ceramic braid inside a ceramic matrix over the wires.

At block 1108, ceramic braid is wrapped over the processed braids with the wires (e.g., a CMC subassembly). The ceramic braid may be wrapped over the braided wires and the thermocouple junction. Once wrapped, the rod is infused at block 1109 similar to the infusion at block 1104 and is processed at block 1110 similar the processing at block 1106 to stiffen the ceramic braid wrapped over the processed wires. Wires, braids, and CMC subassemblies processed into rods assembled according to blocks 1101-1110 can withstand the high temperature process of flowchart 1100, so are unchanged inside the resulting rod structure.

At block 1112, the rod is inserted into a base and covered with a sheath. The base and/or sheath may be of a ceramic material, and each may function as outer tube 104 or sheath 108 respectively as described above according to FIGS. 1-7.

Referring next to FIGS. 12A and 12B, another embodiment of a temperature probe is shown according to aspects of the invention. The temperature probe 1200 includes an extrusion 1218 (e.g., a rod), a probe base 1204, a thermocouple 1206, and a sheath 1202 disposed over the probe base 1204, extrusion 1218 and thermocouple 1206. As depicted, a thermocouple junction 1208 may be exposed and extend outward from the sheath 1202.

The probe base 1204 includes a first portion 1222 that is cylindrical and a second portion 1224 that is frustoconical. The probe base 1204 also includes a cylindrical passage 1205 formed through the center of the probe base 1204 that is configured to receive the extrusion 1218. In an embodiment, the probe base 1204 is constructed from an alumina-based material. The probe base 1204 may include an end portion 1216 that extends from the sheath 1202 and is not covered by the sheath 1202. In an embodiment, a metal base is positioned over the end portion 1216, and assembled to the probe 1200 by a brazing process described at FIG. 13.

The extrusion 1218 extends through the cylindrical passage 1205 of the probe base 1204. In one embodiment, the extrusion 1218 is constructed from an alumina-based material. In an embodiment, the extrusion 1218 is about 0.125 inches in diameter. The extrusion 1218 includes channels 1220 formed throughout the length of the extrusion 1218 that are configured to receive the wires 1207 of the thermocouple 1206, thereby insulating the thermocouple wires 1207 from exposure to high temperatures. As depicted, the extrusion 1218 extends partially through the cylindrical passage 1205 of the probe base 1204, although it is contemplated that the extrusion 1218 may extend fully through the probe base 1204, or alternatively not extend through the probe base 1204, such that only the thermocouple wires 1207 extend through the cylindrical passage 1205.

The thermocouple 1206 is formed of thermocouple wires 1207 that extend through the cylindrical passage 1205 and are inserted in the channels 1220 with a thermocouple junction 1209 formed at the tip 1208 of the probe 1200. In an embodiment, each of the wires 1207 are about 0.017 inches in diameter. The thermocouple junction 1209 may function as the temperature sensing mechanism of the probe 1200. As depicted, the thermocouple junction 1209 is exposed through the opening in the tip 1208 at the distal end of the probe 1200.

A sheath 1202 is formed over a portion of the probe base 1204 and the extrusion 1208. It is contemplated that the sheath 1202 may be formed over the entire probe base 1204 and/or over the thermocouple junction 1209 at the tip 1208 of the probe 1202. The sheath 1202 may be constructed from a fiber braid (e.g., Nextel braid, alumina fiber, alumina matrix, silicon-based fiber, silicon-based matrix, silicon carbide-based fiber and/or matrix, etc.) which may be processed to form a ceramic matrix composite (e.g., adding ceramic precursor, processing until stiff, and sintering at high temperatures, etc.).

The probe 1200 includes portions of various shapes. At the proximal end of the probe 1200 is a cylindrical portion 1210 with a diameter greater than the diameter of the cylindrical portion 1214 at the distal end of the probe 1200. Between portion 1210 and 1214 is a frustoconical portion 1212 with a diameter that decreases toward the distal end of the probe 1200. The configuration of the portions 1210, 1212, and 1214 advantageously increases the resistance of the probe 1200 to stress forces applied to the probe 1200 during operation. In an embodiment, the sheath 1202 has an outer diameter of about 0.425 inches and an inner diameter of about 0.3 inches at the portion 1210. In one embodiment, the sheath 1202 has an outer diameter of about 0.25 inches and an inner diameter of about 0.125 inches at the portion 1214. The length of the probe 1200 along portions 1210, 1212, and 1214 may be about 2.15 inches. The length of the portion 1210 may be about 0.433 inches, with the length of the portion 1212 about 0.539 inches and the length of the portion 1214 about 1.178 inches. In an embodiment, the frustoconical portion 1212 may decrease in diameter at an angle of about 9 degrees.

Although three portions are depicted, it is contemplated that other shapes and configurations can be utilized to achieve the desired advantage. For example, the probe may include only two portions, with one portion having a diameter larger than the other portion, the probe may be entirely frustoconical, the probe may include four or more portions, etc. In an embodiment, the sheath 1202 is thicker near the probe base 1204 than at the probe tip 1208 to increase resistance to stress. Other shapes and configurations for the probe will be understood by one of skill in the art from the disclosure herein.

Figure 13A:
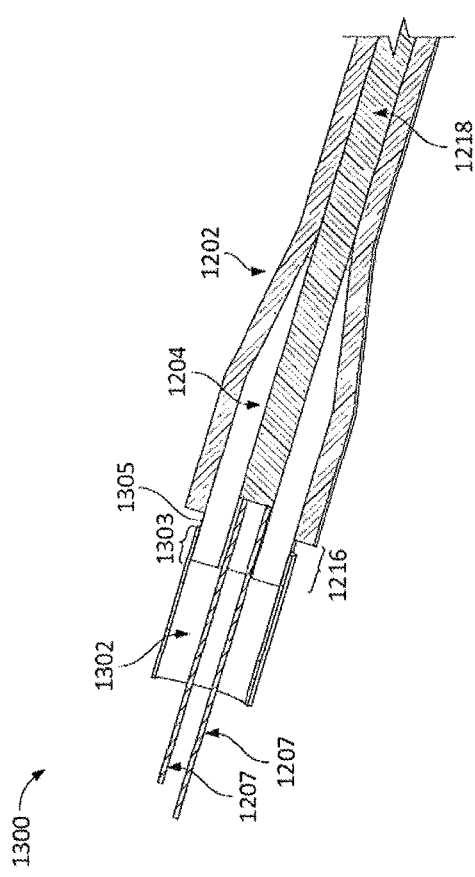
FIGS. 13A and 13B are views of a probe according to aspects of the invention.
Figure 13B:
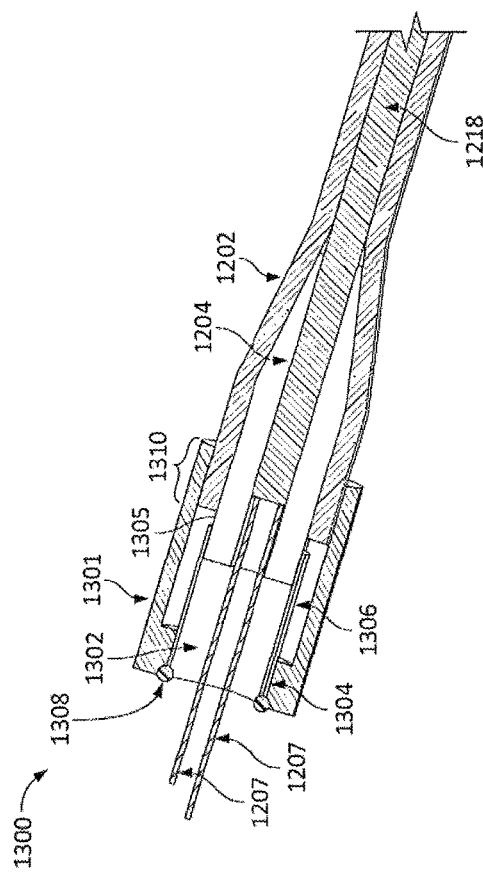

Referring next to FIGS. 13A and 13B, a probe 1300 with a metal base 1301 is depicted. The probe 1300 includes a rod 1218, thermocouple wires 1207 extending through the rod 1218, a probe base 1204, and a sheath 1202 formed over the rod 1218 and the probe base 1204, similar to the features described with respect to FIGS. 12A and 12B. The probe 1300 also includes a metal base 1301 which is constructed of a thin wall inner tube 1302 and a thick wall outer tube 1304. The inner tube 1302 may be brazed to the probe base 1204. In an embodiment, the inner tube 1302 extends over the exposed portion 1216 of the probe base 1204. In one embodiment, a portion 1303 of the inner tube 1302 extends over the portion 1216 of the probe base 1204 such that a space 1305 remains between the inner tube 1302 and the sheath 1202. The inner tube 1302 may be an alloy, such as Nickel 201, Haynes 230, etc. The inner tube 1302 may have a thickness between about 0.010 inches to about 0.015 inches and may have a length of about 0.50 inches. In embodiments where the portion 1303 of the inner tube 1302 extends over the probe base 1204, the overlapping portion 1303 may have a length of about 0.10 inches.

The inner tube 1302 may be brazed to the probe base 1204 or other parts of the probe 1200. In such embodiments, the portion 1303 of the inner tube 1302 that overlaps the probe base 1204 forms a braze joint. The inner tube 1302 is thin as compared to the outer tube 1304 so that stress in the ceramic of the probe base 1204 due to brazing and forming the braze joint is kept at a minimum. The braze may be a high temperature active metal braze, such as palladium alloy.

The thick wall outer tube 1304 is depicted over the inner tube 1302. The outer tube 1304 may be welded to the inner tube 1302 at welding points 1308. The outer tube 1304 may be constructed of an alloy, such as Haynes 230, or other alloys suitable for use in high temperature applications utilizing temperature probes. The outer tube 1304 includes a channel 1306 shaped to extend over the sheath 1202 of the probe 1300. As depicted, a portion 1310 of the outer tube 1304 extends over a portion of the sheath 1202. In one embodiment, the portion 1310 of the outer tube 1304 that extends over the sheath 1202 is close in proximity to the sheath 1202, but not physically attached to the sheath 1202. In such embodiments, the welds 1308 affix the outer tube 1304 to the probe 1300 and the non-physical attachment between the portion 1310 and the sheath 1202 provide the probe 1300 with additional resistance to stress forces present in, for example, turbines. The outer tube 1304 may transition (e.g., via a weld) to a flange and junction box for attachment to a turbine wall.

At FIG. 14, a flowchart 1400 with steps for constructing a temperature probe is shown. At block 1402, two wires are welded together to form a thermocouple. The wires may be constructed of Platinel® material. At block 1404, an extrusion (e.g., a rod) is formed with channels. The extrusion may be an alumina-based material. At block 1406, the welded wires are installed though the channels in the extrusion. At block 1408, a probe base is positioned over an end of the extrusion. Once the probe base is positioned over the end of the extrusion, the extrusion may extend entirely through the probe base or partially through the probe base.

At block 1410, a ceramic braid is wrapped over the extrusion and the probe base. The ceramic braid may be wrapped over the entirety of the extrusion and the probe base, or partially over the extrusion and/or the probe base. The ceramic braid may be constructed of an alumina-based material, a silicon-based material, a carbon-based material, and/or other materials suitable to be formed into a ceramic matrix composite material. The ceramic braid may be wrapped to varying thicknesses across the probe base and the extrusion to achieve a desired shape or construction.

At block 1412, the wrapped ceramic fiber is infused with a ceramic matrix precursor. In an embodiment, the ceramic matrix precursor is liquid. At block 1414, the infused ceramic fiber is processed to form the CMC material over the probe base and the extrusion. The infused ceramic fiber may be first processed at a relatively low temperature until stiff. In one embodiment, the infused ceramic fiber is processed at about 400 F. Once the infused ceramic fiber is stiff, it is then sintered at high temperatures until the CMC material is formed. In an embodiment, the fiber is sintered at about 1200 C.

At block 1414, a metal base is brazed to the probe base. The metal base may include an inner tube, such as thin wall inner tube 1302. The brazing technique is of a type used to fasten metals to ceramic materials. The brazing technique is carried out at high temperatures (e.g., about 1000 C or more). Materials used for such brazing may include palladium alloys, nicrobraze materials, etc. In one embodiment, titanium (e.g., 4% of the braze alloy constituent) may be used in the braze metal. The brazing of the metal to ceramic braze joints is conducted such that the molten braze material will wet the ceramic side of the joint, since ceramics are not normally wet by molten metals. In an embodiment, the surface of the ceramic material is prepared with a moly-manganese compound and firing process. In one embodiment, a CMC material is deposited between the inner tube and the probe base to facilitate brazing and forming of the braze joint.

The shape of the braze joint is chosen such that the difference in thermal expansion rates between the braze metal and the ceramic of the probe base is accommodated, thereby keeping the stresses in the braze joint area to a minimum during the brazing process. In an embodiment, the metal base is a thin wall inner tube (e.g., inner tube 1302) to keep the stresses to a minimum. The overlap of the inner tube with the probe base may be of simple geometry (e.g., simple cylindrical overlap) or of other geometry (e.g., square overlap, conical overlap, toroid overlap, etc.).

Alternative configurations of the probe parts and materials will be understood from the disclosure herein. For example, all components, including the extrusion (e.g., rod) may be constructed of materials to be formed into CMC materials.

An interior oxide CMC material may be used in combination with an exterior non-oxide CMC material.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A temperature probe comprising: a rod having a longitudinal axis and a securing protrusion, the securing protrusion located in an area of the rod having a cross section in a plane normal to the longitudinal axis that is larger in circumference than other cross sections of the rod at other points; a thermocouple embedded within the rod; an outer metal tube surrounding at least a portion of the rod; an inner metal tube positioned between the rod and the outer metal tube configured to prevent the rod from spatial displacement with respect to the outer metal tube; and a ceramic matrix composite sheath substantially surrounding the rod and the outer metal tube.

2. The temperature probe in accordance with claim 1, wherein the rod includes at least a first member and a second member and wherein at least one of the first and second members includes a groove that forms a channel; and wherein the thermocouple is positioned within the channel.

3. The temperature probe in accordance with claim 1, wherein the outer tube has a lip configured to engage the securing protrusion of the rod to obstruct the rod from fully passing through the outer tube.

4. The temperature probe in accordance with claim 3, wherein the inner tube has a first end, the first end of the inner tube contacting the securing protrusion of rod opposed the lip of outer tube.

5. The temperature probe in accordance with claim 4, wherein the securing protrusion of the rod is secured between the first end of the inner tube and the lip of the outer tube.

6. A method for assembling a temperature probe, comprising: positioning a thermocouple between a first member and a second member; mating the first member and the second member to form a rod, the rod having a longitudinal axis and a securing protrusion located in an area of the rod having a cross section in a plane normal to the longitudinal axis that is larger in circumference than other cross sections of the rod at other points; placing an outer tube having a lip configured to engage the securing protrusion of the rod over at least a portion of the rod to engage the lip of the outer tube to the securing protrusion of the rod and to engage the first member to the second member; placing an inner tube between at least a portion of the rod and at least a portion of the outer tube to secure the rod with respect to the outer tube; and applying a ceramic matrix composite sheath to substantially cover the rod and the outer metal tube.

7. A temperature probe, comprising: a rod; a thermocouple embedded in the rod; a probe base extending over an end of the rod; a sheath covering at least a portion of the rod and a portion of the probe base; and a metal base assembled to an end of the probe, wherein at least one of the rod, the probe base, or the sheath include a ceramic matrix composite material, and wherein the metal base includes a thin wall inner tube and a thick wall outer tube, the thin wall inner tube forming a braze joint at the probe base.

8. The probe of claim 7, wherein the sheath comprises a braided ceramic matrix composite material.

9. The probe of claim 7, wherein the probe base includes a cylindrical passage configured to receive the end of the rod.

10. The probe of claim 7, wherein the thermocouple comprises a thermocouple junction that extends through an opening formed at an end of the sheath.

11. The probe of claim 7, wherein the metal base extends over an end portion of the probe base.

12. The probe of claim 7, further comprising a ceramic matrix composite material disposed between the metal base and the end of the probe.

13. The probe of claim 7, wherein the probe base includes a cylindrical portion and a frustoconical portion.

14. The probe of claim 13, wherein the frustoconical portion of the probe base extends over the end of the rod.

15. The probe of claim 7, wherein the thermocouple comprises: a first thermocouple wire; and a second thermocouple wire coupled to the first thermocouple wire to form the thermocouple.

16. The probe of claim 15, wherein the rod comprises a first ceramic matrix composite material braided over the first wire and a second ceramic matrix composite material braided over the second wire.

17. The probe of claim 15, wherein the first thermocouple wire and the second thermocouple wire are coupled with a weld.

18. The probe of claim 7, wherein the rod comprises an extrusion including at least one channel formed therein.

19. The probe of claim 18, wherein the thermocouple is inserted through the at least one channel.

20. The probe of claim 18, wherein the extrusion is an alumina-based material.

21. A method for assembling a temperature probe, comprising: forming a rod with at least one channel; installing wires of a thermocouple through the at least one channel; positioning a probe base over an end of the rod; wrapping a ceramic braid over the probe base and rod; and processing the ceramic braid into a ceramic matrix composite material, thereby forming a sheath around the probe base and rod.

22. The method of claim 21, further comprising exposing an end of the thermocouple through an end of the sheath.

23. The method of claim 21, further comprising infusing the ceramic braid with a ceramic matrix precursor.

24. The method of claim 21, wherein the forming step further includes forming an alumina-based extrusion with at least one channel as the rod.

25. The method of claim 21, further comprising brazing a metal base to an end of the probe base.

26. The method of claim 25, wherein the brazing step further comprises: positioning a thin wall inner tube of the metal base over a portion of the probe base; and heating the inner tube and the probe base to a brazing temperature.

27. The method of claim 25, wherein the brazing step further comprises: depositing a ceramic matrix composite material between the metal base and the probe base; and heating the temperature probe to a brazing temperature.

28. The method of claim 27, wherein the heating step further comprises heating the temperature probe to a temperature of about 1000 C as the brazing temperature.

* * * * *